3,336,148
NITRIC ACID TREATMENT OF CARBON BLACK
Thomas J. Gunnell and Yuan C. Fu, Bartlesville, Okla., assignors to Phillips Petroleum Company, a corporation of Delaware
Filed Feb. 26, 1964, Ser. No. 347,592
9 Claims. (Cl. 106—307)

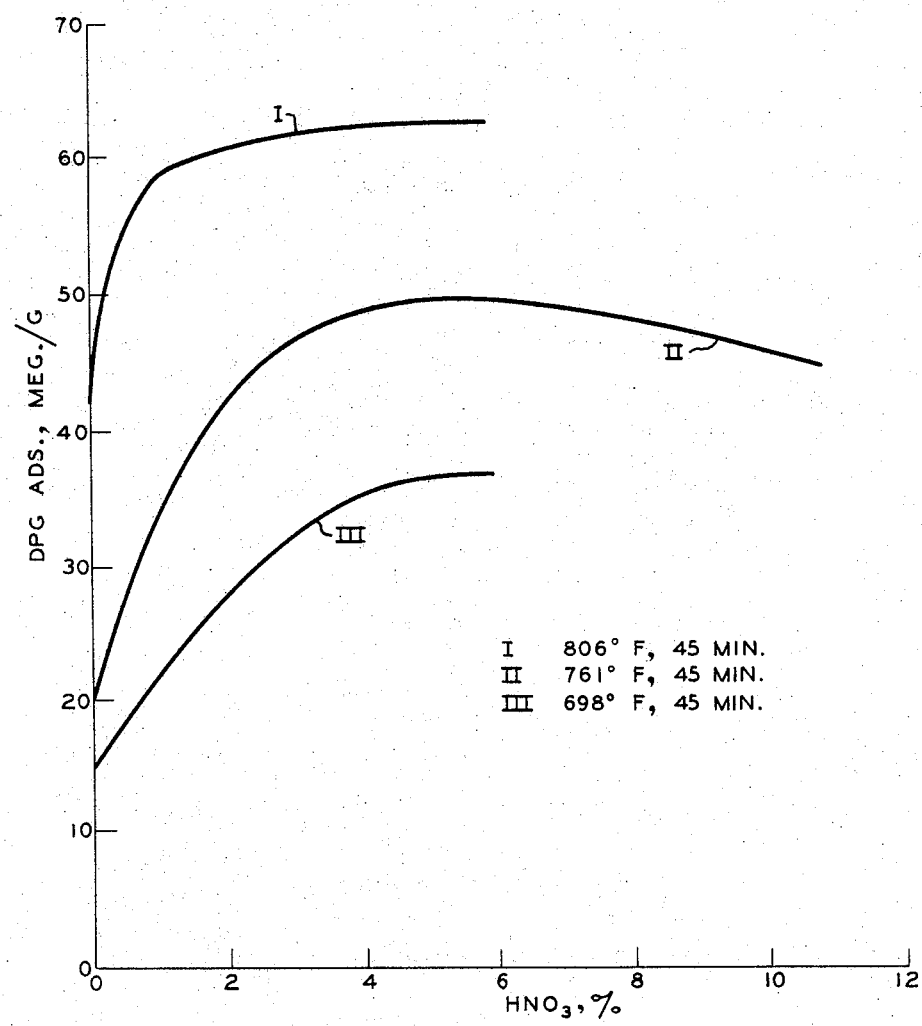

ABSTRACT OF THE DISCLOSURE

Furnace carbon black having a diphenylguanidine adsorption value substantially less than 35 microequivalents per gram of black and a volatile matter content substantially below 3 weight percent is treated with dilute nitric acid in an $O_2$-containing ambient wherein the partial pressure of oxygen is at least 0.1 atmosphere at a temperature in the range of 680 to 900° F. for a period of at least 10 minutes and sufficient to provide product black having a diphenylguanidine adsorption value of at least 35 microequivalents per gram of black and a volatile matter content of at least 3 weight percent. This process provides a modified furnace carbon black which is equivalent to or better than channel black as a reinforcing agent for rubber.

---

This invention relates to a process for the nitric acid treatment of furnace carbon black to produce a simulated channel black.

Channel black processes have largely been replaced by furnace black processes so that little channel black is now being produced. The greatest use of carbon black is in the manufacture of automobile tires and tires for other types of vehicles. Furnace blacks are more desirable for use in most vehicle tires, particularly, for high speed service on modern highways. However, channel black, when used in rubber, produces tires of better service for off-the-highway use, such as on road machinery, on farm implements and trucks, and on other vehicles utilized in rough, cross-country service.

Since most channel black plants have been replaced with furnace black plants, currently there is more demand for channel black than can be taken care of by the existing channel black plants. Hence, it is desirable to find an economical process for converting a furnace black to a carbon black which has properties of a channel black.

This invention is concerned with a method or process for treating furnace black with nitric acid in such a manner that the resulting carbon black is equivalent to or better than standard channel black as a reinforcing agent for rubber.

Accordingly, it is an object of the invention to provide a process for treating furnace carbon black with nitric acid so as to produce a simulated channel black or a black having characteristics in rubber reinforcing equivalent to or better than channel black. Another object is to provide an improved process for treating furnace black with nitric acid. Other objects of the invention will become apparent to one skilled in the art upon consideration of the accompanying disclosure.

A broad aspect of the invention comprises treating furnace carbon black with a minor amount of nitric acid at a temperature in the range of 680 to 900° F., while maintaining a partial pressure of oxygen of at least 0.1 atmosphere for a period of at least 10 minutes and sufficient to provide product black having a diphenylguanidine adsorption value of at least 35 microequivalents per gram of black and a volatile matter content of at least 3 weight percent. This process provides a modified furnace carbon black which is equivalent to or better than channel black as a reinforcing agent for rubber.

Various methods for treating carbon blacks to reduce pH and impart certain characteristics to the products have been proposed. It is known that the acidity of furnace carbon black can be increased, and to some extent the volatiles content, by treatment with a water-soluble oxidizing agent such as nitric acid, hydrogen peroxide, sodium hypochlorite, or the like. For this type of treatment the temperature is generally kept below 650° F. At higher temperatures much of the acidity is frequently lost, sometimes as much as 50 percent or even more. Air oxidation of furnace black at a high temperature generally gives a product with a high volatiles content. If a furnace carbon black is treated with nitric acid at a low temperature, say around 400 or 410° F., a product with a high acidity is obtained. Heat treatment of this black in air at a higher temperature, say around 680 to 700° F., generally causes a pronounced reduction in acidity and not much change in volatile matter. Reference can be made to Example III which shows the results obtained when operating in this manner. In view of these results, it would not appear that a high temperature would give a high acidity and/or a volatiles content in excess of 3 weight percent.

It has now been found, contrary to expectations, that a carbon black with high acidity (low pH) and a high volatiles content can be obtained by a high temperature nitric acid treatment of furnace black. In this process the treatment is carried out in one step with the temperature being maintained in the range of 680 to 900 F., preferably below 820° F. Carbon black, either in the form of pellets or loose black, is contacted at a temperature in the specified range with aqueous nitric acid. Oxygen is also present in the system, a partial pressure of at least 0.1 atmosphere being maintained. A flow of air through the system to provide 0.21 atmosphere of oxygen gives satisfactory results and is a preferred method of operation. The oxygen level in the system is kept relatively low to prevent loss of black. If desired, the oxygen supply can be regulated by diluting the air stream with nitrogen. Extended heat treatment of the acid treated black at elevated temperatures below 680° F. must be avoided if the benefits of the invention are to be obtained.

The amount of nitric acid, utilized (calculated as 100% nitric acid) is kept low and is generally less than 10 weight percent, based on the carbon black. For most purposes it is at least 0.3 and less than 7.5 weight percent. The preferred range is about 1 to 3.5 weight percent, based on the weight of carbon black. Instead of using nitric acid, nitrogen dioxide can be added to the water to form the acid in situ. The quantity of water used is generally in the range of 25 to 150 weight percent, preferably from 40 to 100 weight percent, based on the dry carbon black. Water merely serves to more nearly uniformly distribute the acid in the carbon black.

The treating time depends upon the temperature and is affected to some extent by the nitric acid concentration in the black. It must be long enough to give DPG adsorption and volatiles content values as hereinabove set forth. In general, the treating period is in the range of 10 to 120 minutes. For most purposes a treating time in the range of 30 to 60 minutes is adequate. Lower acid concentrations and lower temperatures in the ranges disclosed require longer heating periods in said range, and vice versa.

The accompanying drawing is a graph showing 3 curves representing the DPG (diphenylguanidine) adsorption values in microequivalents per gram of simulated channel black produced by the process of the invention at three different temperatures and at a range of acid concentrations in the black. Curves I, II, and III represent temperature treatments at 806° F., 761° F., and 698° F., respectively. Each treatment period was for 45 minutes. These curves demonstrate that low acid concentrations such as the range of 1 to 3.5 weight percent, based on the weight of the carbon black, are more effective for treatment of the carbon black in accordance with the process of this invention.

Numerous variations in operating details can be used when carrying out the process of this invention. A fluidized bed operation is generally preferred. In this method the carbon black is first wetted with aqueous nitric acid to incorporate the desired amount of nitric acid therein and the resulting black is placed in a suitable treating zone. A hot oxygen-containing gas such as air, air diluted with nitrogen, a mixture of oxygen and nitrogen, or the like, at a temperature in the range of 680 to 900° F., is then passed in contact with the wetted black for such time as required to give a product with a DPG adsorption of at least 35 microequivalents per gram of black and a volatiles content of at least 3 weight percent. Either loose or pelleted carbon black can be used in this process.

In an alternative procedure, preparation and treating of furnace carbon black is carried out in a continuous operation. Carbon black is passed from the reactor through a quenching zone and thence to a cyclone separator. The loose black is then transferred to a treating zone provided with an inlet for an aqueous nitric acid spray and an inlet for air or other oxidizing gas. Temperature in the treating zone is maintained in the range of 680 to 900° F., as hereinbefore specified. The treated black is then passed through a cyclone separator and on to a pellet mill. Air is recycled from the cyclone separator to the treating zone and fresh air or other oxidizing gas supplied as needed.

As can be seen from the foregoing discussion, this process provides a means for treating a furnace carbon black at a high temperature and in one step with aqueous nitric acid and air to yield a product with a particular combination of properties. The product resembles channel black in its high DPG adsorption and high volatiles content. It is a good reinforcing agent for natural and synthetic rubber and gives vulcanizates with excellent properties.

*Example 1*

Runs were made for the oxidation of a high abrasion furnace carbon black in pelleted form using a combination of nitric acid and air. The original black had the following properties:

Oil absorption, cc./g. ---------------------------- 0.90
Surface area, m.$^2$/g. ---------------------------- 77
pH ---------------------------------------------- 7.3
DPG, meq./g. ------------------------------------ 15.3
Volatile matter, wt. percent --------------------- 1.24

Treatment of the carbon black was carried out in a Pyrex tube 20 inches long and having an inside diameter of 1.25 inches. The tube was placed in a vertical position and fitted with a fritted glass plate at the bottom to support the carbon black. An inlet tube was provided at the bottom for introduction of air. The carbon black was first wetted with nitric acid solution using 40 parts by weight of water per 60 parts by weight of black. The acid content of the water was adjusted as desired prior to contacting the black with it. Runs were made in which the amount of nitric acid, treating time, and treating temperature were varied. In most of the runs the partial pressure of oxygen (from passage of air through the system) was maintained at 0.21 atmosphere. In two runs (25 and 26) nitrogen was added to the air stream to reduce the oxygen content and in one run (27) nitrogen was used instead of air. The amount of carbon black treated in each run was 30 grams. Data are presented in Table I.

TABLE I

| Run No. | Temp., ° F. | HNO$_3$, wt. percent [a] | Linear Air Velocity, ft./min. | O$_2$ Partial Pressure, atm. | Treating Time, min. [b] | pH | DPG Ads., meq./g. | Volatiles, wt. percent | Surface Area, m.$^2$/g. |
|---|---|---|---|---|---|---|---|---|---|
| Effect of HNO$_3$ Concentration at Different Temperatures ||||||||||
| 1 | 752 | 0 | 68 | 0.21 | 45 | 5.5 | 20.3 | 2.78 | 107 |
| 2 | 752 | 2 | 68 | 0.21 | 45 | 4.1 | 41.5 | 3.20 | 113 |
| 3 | 752 | 3.5 | 68 | 0.21 | 45 | 3.8 | 49.0 | 3.44 | |
| 4 | 761 | 1 | 68 | 0.21 | 60 | 4.2 | 43.2 | 3.90 | |
| 5 | 761 | 2 | 68 | 0.21 | 60 | 4.0 | 49.7 | 3.48 | 142 |
| 6 | 761 | 3.5 | 68 | 0.21 | 60 | 3.8 | 58.0 | 3.50 | |
| 7 | 761 | 5 | 68 | 0.21 | 60 | 3.7 | 56.0 | 3.77 | 153 |
| 8 | 770 | 1 | 68 | 0.21 | 45 | 4.3 | 35.2 | 3.38 | |
| 9 | 770 | 5 | 68 | 0.21 | 45 | 3.8 | 49.1 | 4.03 | |
| 10 | 770 | 6.5 | 68 | 0.21 | 45 | 3.7 | 49.6 | 3.86 | |
| 11 | 770 | 7.5 | 68 | 0.21 | 45 | 3.8 | 46.5 | 3.90 | |
| 12 | 806 | 1 | 68 | 0.21 | 45 | 3.9 | 58.7 | 3.72 | 167 |
| 13 | 806 | 3.5 | 68 | 0.21 | 30 | 4.0 | 51.1 | 3.30 | |
| 14 | 806 | 3.5 | 68 | 0.21 | 45 | 3.7 | 62.6 | 3.64 | 132 |
| 15 | 806 | 5 | 68 | 0.21 | 30 | 3.9 | 53.3 | 4.03 | |
| 16 | 806 | 5 | 68 | 0.21 | 45 | 3.7 | 61.7 | 4.57 | 159 |
| Effect of Treating Time at Different Temperatures ||||||||||
| 17 | 698 | 0 | 68 | 0.21 | 45 | 6.2 | 16.3 | 2.45 | |
| 18 | 698 | 5 | 68 | 0.21 | 45 | 4.3 | 36.1 | 2.90 | 94 |
| 19 | 698 | 5 | 68 | 0.21 | 60 | 4.0 | 37.9 | 3.08 | 99 |
| 20 | 752 | 5 | 68 | 0.21 | 30 | 4.1 | 36.8 | 2.50 | |
| 21 | 752 | 5 | 68 | 0.21 | 60 | 3.7 | 53.4 | 3.36 | |
| 22 | 761 | 3.5 | 68 | 0.21 | 30 | 4.2 | 34.0 | 2.70 | |
| 23 | 761 | 3.5 | 68 | 0.21 | 45 | 3.8 | 43.6 | 3.36 | |
| Effect of Partial Pressure of Oxygen ||||||||||
| 24 | 770 | 7.5 | 68 | 0.21 | 45 | 3.8 | 46.5 | 3.90 | |
| 25 | 770 | 7.5 | 68 | 0.15 | 45 | 4.0 | 43.7 | 3.18 | |
| 26 | 770 | 7.5 | 68 | 0.08 | 45 | 4.6 | 40.0 | 2.50 | |
| 27 | 770 | 7.5 | 68 | 0.0 | 45 | 4.8 | 36.4 | 1.73 | |

[a] Based on weight of carbon black.
[b] Total time from beginning of run, includes time required of about 10–15 min. to reach specified reaction temperature.

Runs 1 and 17 are controls made in the absence of nitric acid. In both cases the DPG adsorption and volatiles content are below the required levels. Runs 2 through 16 were made at variable nitric acid levels, from 1 to 7.5 weight percent based on the carbon black, and the temperature was varied from 752 to 806° F. The products in all cases had DPG adsorption and volatiles content above the required values. Runs 18 through 23 show that the treating time is dependent upon the temperature. The DPG adsorption was satisfactory in runs 18 and 20 but the volatiles content was not high enough. A longer treating time in each case gave the desired results. The product in run 22 did not meet either specification but a longer treating time at the same temperature gave a satisfactory product.

A series of runs was made similar to those in Table I except that the treating temperature was lower. These data are presented in Table II:

TABLE II

| Temp., °F. | $HNO_3$ wt. percent a | Linear Air Velocity, ft./min. | Treating Time, min. | pH | DPG Ads., meq./g. | Volatiles, wt. percent |
|---|---|---|---|---|---|---|
| 410 | 1 | 69 | 30 | 4.4 | 25.8 | 1.81 |
| 440 | 2.5 | 69 | 30 | 4.2 | 28.6 | 2.05 |
| 390 | 2.5 | 69 | 100 | 3.5 | 33.4 | 2.06 |
| 410 | 3.5 | 69 | 30 | 3.4 | 35.2 | 2.21 |
| 405 | 3.5 | 69 | 100 | 3.3 | 33.0 | 2.07 |
| 410 | 5.0 | 69 | 30 | 3.4 | 42.5 | 2.24 | a Based on weight of carbon black.

These data show that low temperature nitric acid treatment gives the desired surface acidity (low pH) but the volatiles content is too low in all cases, and in all but two runs the DPG adsorption was too low.

*Example II*

A sample of the pelleted carbon black used in Example I was treated with nitric acid in the manner described therein, except that the Pyrex tube reactor was 2.25 inches in diameter and 27 inches in length. The amount of carbon black treated was 150 grams and the linear air velocity was 52 feet per minute. Treatment was carried out at 752° F. for 45 minutes. The amount of nitric acid used was 7.5 weight percent, based on the carbon black. The treated product had the following properties:

| | |
|---|---|
| pH | 3.7 |
| $N_2$ surface area, m.²/g. | 110 |
| DPG adsorption, meq./g. | 47.2 |
| Volatiles, wt. percent | 4.17 |

This carbon black was evaluated in the following natural rubber tread recipe:

| | Parts by wt. |
|---|---|
| Natural rubber | 100 |
| Carbon black | 45 |
| Zinc oxide | 3 |
| Stearic acid | 3 |
| Flexamine [1] | 1 |
| Flexzone 3C [2] | 2 |
| Aromatic oil (Philrich 5) | 5 |
| Vultrol [3] | 1 |
| Sulfur | 2.25 |
| NOBS Special [4] | 0.7 |

[1] Physical mixture containing 65 percent of a complex diarylamine-ketone reaction product and 35 percent of N,N'-diphenyl-p-phenylenediamine.
[2] N-isopropyl-N'-phenyl-p-phenylenediamine.
[3] N-nitrosodiphenylamine.
[4] N-oxydiethylene-2-benzothiazyl sulfenamide.

The compounded rubber was cured at 293° F. and physical properties determined. The following processing properties and physical properties of the vulcanized stock were obtained:

PROCESSING PROPERTIES

| | |
|---|---|
| Compounded ML-4 at 212° F. | 44.0 |
| Scorch at 250° F., min. | 27.6 |
| Extrusion at 250° F.: | |
| In./min. | 40.0 |
| G./min. | 78.5 |
| Rating (Garvey die) | 9+ |

CURED AT 293° F.

| | |
|---|---|
| $\nu \times 10^4$, moles/cc.: | |
| 10 min. | 0.45 |
| 20 min. | 1.56 |
| 30 min. | 1.65 |
| 45 min. | 1.58 |
| 75 min. | 1.46 |
| Compression set, percent: | |
| 20 min. | 51.6 |
| 30 min. | 29.5 |
| 45 min. | 16.4 |
| 300% modulus, p.s.i.: | |
| 10 min. | 470 |
| 20 min. | 1190 |
| 30 min. | 1340 |
| 45 min. | 1340 |
| 75 min. | 1340 |
| Tensile, p.s.i., 30 min. | 4330 |
| Elongation, percent, 30 min. | 630 |
| $\Delta T$, °F., 30 min. | 35.4 |
| Resilience, percent, 30 min. | 78.0 |
| Shore A hardness, 30 min. | 58.0 |

The data show that the rubber had very good properties. The slow initial cure, evidenced by the high compression set, is advantageous. The low modulus at short cure time shows that this carbon black is similar to channel black. (Wyex, a commercial channel black, when used in the same rubber compound, gave a 300% modulus of 520 p.s.i. when cured 10 minutes at 293° F. and 1320 p.s.i. after a 20-minute cure at the same temperature.)

*Example III*

The carbon black described in Example I was wetted with water containing 5 weight percent nitric acid, based on the black. The weight ratio of water:carbon black was 40:60. The wetted black was treated in a Fischer Isotemp oven at 410° F., in atmospheric air for two hours after which the pH, DPG adsorption, and volatile matter were determined. The nitric acid-treated black was then heated in the oven two hours as before except that the temperature was increased to 690° F. Properties were again determined. Results were as follows:

| | $HNO_3$-Treated Carbon Black | |
|---|---|---|
| | 410° F. | 690° F. |
| pH | 3.0 | 3.7 |
| DPG ads., meq./g. | 54.3 | 39.5 |
| Volatile content, wt. percent | 2.49 | 2.66 |

These data show that the acidity was reduced by heating the nitric acid-treated black. The volatiles content was not high enough in either case to fulfill the requirements.

*Example IV*

Two samples of the pelleted carbon black used in Example I were treated with nitric acid in a manner similar to that described therein except that the Pyrex tube reactor was the same as that described in Example II. Treatment was carried out at 752° F. for 60 minutes (total time from beginning of run). The amount of carbon black employed in each run was 150 grams. Samples of the treated black from each run were evaluated in the natural rubber treated recipe of Example II. Data on treatment of the carbon black, rubber processing properties, and properties of the vulcanizates are presented in Table III below:

TABLE III
CARBON BLACK TREATMENT AND PROPERTIES

| | Run 1 | Run 2 |
|---|---|---|
| Temperature, °F | 752 | 752 |
| Nitric acid, wt. percent [a] | 1 | 2 |
| Linear air velocity, ft./min | 60 | 60 |
| Oxygen partial pressure, atm | 0.21 | 0.21 |
| Treating time, min | 60 | 60 |
| pH | 4.3 | 4.0 |
| DPG adsorption, meq./g | 37.6 | 41.2 |
| Volatiles, wt. percent | 3.53 | 3.54 |
| Surface area, m.²/g | 116 | 103 |

PROCESSING PROPERTIES

| | | |
|---|---|---|
| Compounded ML-4 at 212° F | 44.5 | 49.5 |
| Extrusion at 195° F.: | | |
| in./min | 41.5 | 41.0 |
| g./min | 79.5 | 78 |
| Rating (Garvey die) | 10+ | 10+ |

PROPERTIES OF VULCANIZATES (CURED 30 MINUTES AT 293° F.)

| | | |
|---|---|---|
| $\nu \times 10^4$, moles/cc | 1.76 | 1.70 |
| 300% Modulus, p.s.i | 1300 | 1220 |
| Tensile, p.s.i | 4400 | 4390 |
| Elongation, percent | 615 | 640 |
| $\Delta T$, °F | 30.8 | 29.9 |
| Resilience, percent | 80.1 | 80.7 |
| Shore A hardness | 58 | 58 |

[a] Based on weight of carbon black.

These data show that one or two weight percent nitric acid, based on weight of carbon black, is sufficient for high temperature treatment to produce a good simulated channel black. The stocks had good processing and vulcanizate properties.

Certain modifications of the invention will become apparent to those skilled in the art and the illustrative details disclosed are not to be construed as imposing unnecessary limitations on the invention.

We claim:

1. A process for treating a furnace carbon black having a diphenylguanidine adsorption value substantially less than 35 microequivalents per gram of black and a volatile matter content substantially below 3 weight percent, which comprises the steps of:
    (1) intimately contacting said black with an effective weight proportion of dilute nitric acid for effecting the values of step (3);
    (2) heating said black while in contact with said acid in an ambient having a partial pressure of at least 0.1 atmosphere of $O_2$ at a temperature in the range of 680 to 900° F.; and
    (3) continuing the heating of step (2) for a period in the range of 10 minutes to 120 minutes until the diphenylguanidine adsorption value thereof is at least 35 microequivalents per gram of black and the volatile matter content thereof is at least 3 weight percent.

2. The process of claim 1 wherein the nitric acid is in the range of 1 to 10 weight percent of the carbon black and the water is in the range of 25 to 150 weight percent of the carbon black.

3. The process of claim 1 wherein the black is in pelleted form.

4. A process for treating a furnace carbon black having a diphenylguanidine adsorption value substantially less than 35 microequivalents per gram of black and a volatile matter content substantially below 3 weight percent to raise said value to substantially above 35 microequivalents per gram and said content to above 3 weight percent which comprises the steps of:
    (1) intimately contacting said black with aqueous nitric acid in which the nitric acid is in the range of 1 to 10 weight percent of the black and the water is in the range of 25 to 100 weight percent of the black;
    (2) heating said black while in contact with said acid in an ambient having a partial pressure of $O_2$ of at least 0.1 atmosphere at a temperature in the range of 680 to 820° F.; and
    (3) continuing the heating of step (2) for a period in the range of 10 to 120 minutes and until said adsorptive value and said volatile content have been reached.

5. The process of claim 4 wherein the carbon black is heated to said temperature and thereafter contacted with the aqueous nitric acid while at said temperature.

6. The process of claim 4 wherein the carbon black is wetted with the aqueous acid and thereafter the wet black is heated to said temperature while avoiding any extended heat treatment of the black at temperatures below said range.

7. The process of claim 6 wherein the heat treatment of the wetted carbon black is conducted in a fluidized bed in contact with hot heating gas providing from 0.1 to 0.21 atmosphere of $O_2$.

8. The process of claim 4 wherein the amount of nitric acid is in the range of 1 to 3.5 weight percent of the black.

9. The process of claim 4 wherein the black is in pelleted form.

References Cited

UNITED STATES PATENTS

| 2,420,810 | 5/1947 | Bray et al. | 23—209.1 |
| 2,641,533 | 6/1953 | Cines et al. | 23—209.1 |
| 2,682,448 | 6/1954 | Cines | 23—209.1 |
| 2,707,674 | 5/1955 | Sweitzer | 106—307 |
| 3,023,118 | 2/1962 | Donnet | 106—307 |
| 3,226,244 | 12/1965 | Jordan et al. | 106—307 |
| 3,245,820 | 4/1966 | Melore et al. | 106—307 |

TOBIAS E. LEVOW, *Primary Examiner.*

S. E. MOTT, *Assistant Examiner.*